United States Patent [19]
Oehlbeck et al.

[11] Patent Number: 5,633,719
[45] Date of Patent: May 27, 1997

[54] METHOD AND APPARATUS FOR ALIGNING A LENTICULAR OVERLAY WITH A LENTICULAR PRINT

[75] Inventors: Martin E. Oehlbeck, Rochester; Stephen J. Hassall, Churchville, both of N.Y.

[73] Assignee: Eastman Kodak Company, Rochester, N.Y.

[21] Appl. No.: 330,493

[22] Filed: Oct. 28, 1994

[51] Int. Cl.⁶ .................................................. G01B 11/00
[52] U.S. Cl. ................................................ 356/401; 250/548
[58] Field of Search .................................. 356/399–401, 356/12–14; 250/548, 559.3; 156/58, 494; 354/115; 359/463, 621, 622, 623, 628; 355/123

[56] References Cited

U.S. PATENT DOCUMENTS

| | | | |
|---|---|---|---|
| 4,033,059 | 7/1977 | Hutton et al. | 40/137 |
| 4,034,555 | 7/1977 | Rosenthal | 359/628 X |
| 4,376,584 | 3/1983 | Hart et al. | 356/401 |
| 4,481,050 | 11/1984 | Gundlach et al. | 156/58 |
| 4,588,899 | 5/1986 | Erhardt | 250/491.1 |
| 4,659,226 | 4/1987 | Elabd | 356/401 |
| 4,668,080 | 5/1987 | Gale et al. | 355/51 |
| 5,113,213 | 5/1992 | Sandor et al. | 355/22 |
| 5,391,254 | 2/1995 | Morton | 355/123 X |
| 5,424,553 | 6/1995 | Morton | 250/548 |

*Primary Examiner*—K. Hantis
*Attorney, Agent, or Firm*—Clyde E. Bailey, Sr.; Charles E. Snee, III

[57] ABSTRACT

A lenticular print (13) having image bundles (19), and method and apparatus for aligning and centering image bundles (19) in the print (13) under lenticules in a lenticular overlay (11). On the print are provided one or more two-dimensional fiducial indicia (17) containing one or more angular or linear alignment elements (18, 29, 45) disposed at about two lenticules widths apart.

30 Claims, 5 Drawing Sheets

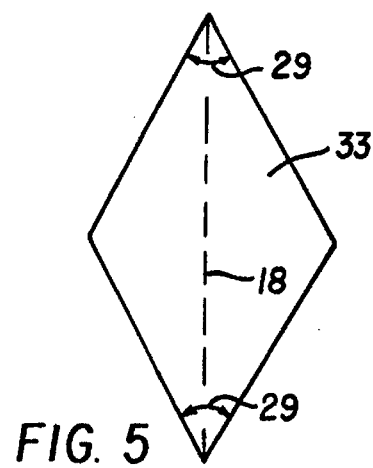
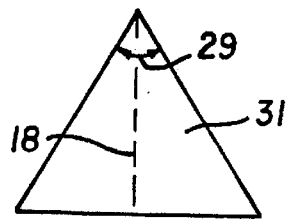
FIG. 5  FIG. 6
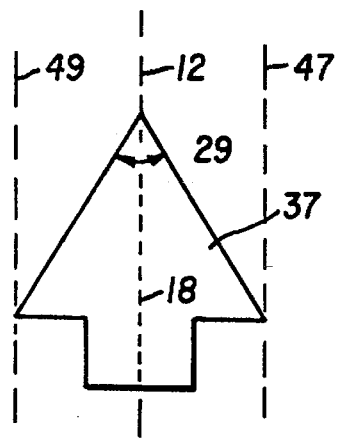
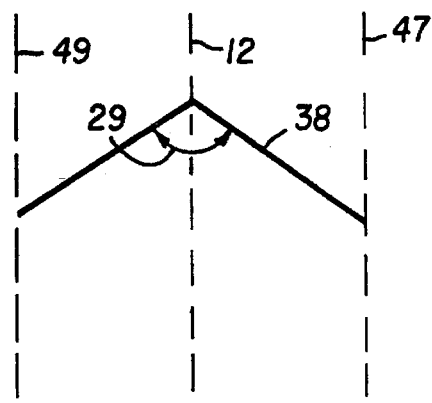
FIG. 7  FIG. 8
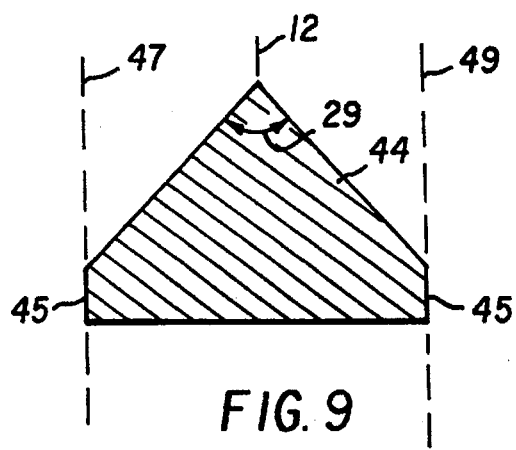
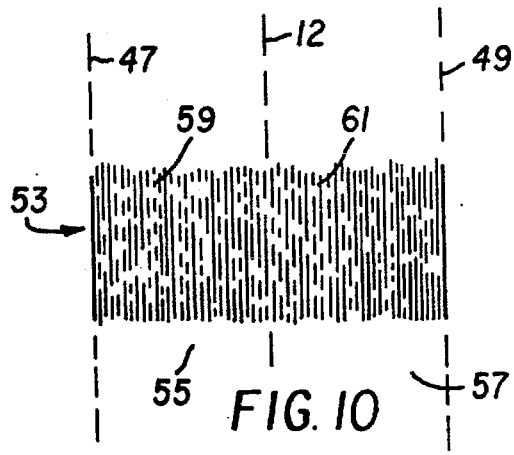
FIG. 9  FIG. 10

METHOD AND APPARATUS FOR ALIGNING A LENTICULAR OVERLAY WITH A LENTICULAR PRINT

FIELD OF THE INVENTION

The invention concerns a method and apparatus for aligning a lenticular overlay with a lenticular print to provide a depth-image or multiple-image print. More particularly, the invention concerns aligning junctures between lenticules of a lenticular overlay or face plate with junctures between image bundles of a lenticular print. This is accomplished by aligning two-dimensional fiducial indicia which have one or more alignment elements, which are printed on the print parallel to the image bundles at one of two critical distances from the edge of the image bundle region, and which are projected through or viewed behind one or more lenticules of the lenticular overlay or face plate.

BACKGROUND OF THE INVENTION

A lenticular image fixed in a recording media, such as a photographic print or transparency media or displayed on a CRT display, is termed a lenticular print and comprises "bundles" of image lines interleaved from a plurality of images of a scene taken from different points of view. Each bundle contains an image line from each of the original images in sequence, and all image bundles are equal in width. When image bundles of equal width abut one another, the width of a bundle is its "pitch." When image bundles of equal width are spaced apart equally, the pitch is the sum of the bundle width and width of the space between bundles. The image lines are created typically by scanning lines of a digital printer or display. A lenticular overlay, or face plate, comprising a plurality of oriented lenticules having the same pitch as the bundles in the lenticular print, when placed over the media and in proper alignment with the image lines, projects the plurality of images at different viewing angles corresponding to the viewing angles of the original scene, and provides an image which evokes a sense of depth to a human viewer.

Generally, when depth images are viewed, the orientation of the lenticules is vertical, i.e., the axes of the cylindrical lens segments run up and down relative to the viewer, although some applications require horizontal lenticules. The invention is equally useful to either orientation. In vertical uses, as the viewer moves his/her head in a lateral direction, new and different perspective views are seen by each of the viewer's eyes, thereby creating not only an autostereoscopic depth image but some "look-around" effect as well. Each perspective view is a result of a set of exposed image or scan lines, one from each bundle under each lenticule, the composite of which comprises the entire view. As the eye is moved laterally, a new set of scanned lines becomes visible as a new composite which in turn comprises the new perspective view.

Image changes are preferably small and gradual as one might expect when viewing a real scene and slowly moving one's head in a lateral direction. However, when the viewer moves past the last image lines in the bundles directly under the lenticules, the first image lines in the adjacent bundles become visible which constitutes an abrupt image shift back to the initial perspective. This effect is termed "image break" and represents a point in the angular space in front of a lenticular print where the primary image is no longer visible, and a "satellite" image appears. Satellite images are equally valid representations of the object scene and serve to increase the total range of angular space that multiple viewers can simultaneously enjoy in a given lenticular picture. However, it is important that the primary image be properly centered to the lenticular array (translational alignment) and that the scan lines and the lenticular axes be parallel to each other (rotational alignment). If the primary image is not centered, its projection space will not be centered on a normal to the print surface which leads to viewer confusion as to the proper viewing angle for the print. If the scan lines are not parallel to the lenticule axes, the image break is seen as an angled moire pattern superimposed over the area image which detracts from the viewer's enjoyment of the display.

In some applications, depth imaging of a single scene is not the objective, but rather two or more completely different depth or even non-depth images are visible depending upon the angle of view, such as, for example, text in one view and pictorial content in a second view. A different type of image break from one image to the next within the bundles is essential to the success of such lenticular applications, and highly-accurate alignment of overlay with print is essential to uniform, sharp image break.

Various approaches have been proposed to ensure that a lenticular image print and a lenticular overlay will be properly aligned during their assembly. The simplest approach typically is for a human operator, using transmitted or reflected illumination, to manipulate either the lenticular print or the overlay or both until all moire lines are eliminated and the depth effect "looks right." This approach can yield excellent image prints, but it is time-consuming, labor-intensive, and not amenable to mechanization and mass production. Optimum translational alignment is also difficult to achieve. This approach also depends upon there being "recognizable" subject matter in the print by which an operator can judge the results of his actions. Unconventional images such as abstract designs, and unconventional uses for depth imaging such as three-dimensional radiography, may provide an operator with few inherent clues as to proper alignment.

Another approach has been to include alignment lines on the margin of the print outside the image area, the lines having a fixed and known lateral relationship to the image bundles, and to scan these alignment lines for alignment with the centers of the overlying lenticules either visually or by any well-known computer image recognition system while moving the overlay or print, first rotationally to eliminate moire lines which is indicated by achieving uniform brightness along the alignment lines, and then translationally to maximize brightness along the alignment lines when the lenticules are centered over the alignment lines. No reference is made or required to the actual lenticular image area for alignment.

A serious drawback of such approaches is that they align directly the centers of the lenticules in the overlay with the centers of the image bundles in the lenticular print by using a visual or electronic signal generated from the central region of the lenticules. However, the slope of the brightness curve is very shallow in the vicinity of maximum brightness at the center of a lenticule, which means that there is a "dead zone" near the center of a lenticule in which relatively large translational movements of the overlay causes relatively small changes in brightness. In this zone, alignment accuracy is low and probability is high that the lenticules of the overlay will not be optimally disposed, that is, accurately centered over the bundles of the lenticular print.

It is a primary object of the subject invention to provide a method and apparatus whereby a lenticular print and a lenticular overlay can be accurately aligned, both rotationally and translationally, by a human operator.

It is a further object of the invention to provide a method and apparatus whereby a lenticular print and a lenticular overlay can be accurately aligned automatically.

It is a further object of the invention to provide two-dimensional fiducial indicia having one or more alignment elements on a lenticular print whereby a lenticular overlay can be accurately aligned with the lenticular print.

SUMMARY OF THE INVENTION

Briefly described, the improved method and apparatus in accordance with the invention are useful for optically aligning a lenticular overlay with a lenticular print. A lenticular print in accordance with the invention has an image region containing a plurality of parallel image bundles of equal width, adjacent bundles having bundle junctures therebetween, and has one or more two-dimensional fiducial indicia on a surface thereof, each indicium having one or more alignment elements disposed at one of two critical distances from any one of the bundle junctures. As used in this specification, "bundle juncture" means either the line along which adjacent bundles abut or a centerline in the region or space between adjacent, equally spaced bundles. A lenticular overlay is slidably positioned on the lenticular print to project images of the fiducial indicia including the alignment elements, and positioning means positions the overlay responsive to one or more characteristics of the projected images.

A lenticular print comprises a region containing a plurality of parallel, adjacent bundles of image lines. On the print, either within or preferably outside of the bundle region, is one or more, preferably two, two-dimensional fiducial indicia. Each indicium has at least one alignment element, described hereinbelow, located at one of two critical distances from any image bundle juncture. The first critical distance $D_1$ is an integral multiple n of the pitch, and the second critical distance $D_2$ is displaced from $D_1$ by ½ the pitch:

$$D_1 = nW. \qquad \text{Eq. (1)}$$

$$D_2 = nW + \tfrac{1}{2}W = D_1 + \tfrac{1}{2}W \qquad \text{Eq. (2)}$$

Each fiducial indicium is preferably an even integral multiple of W in width, preferably 2W or 4W, and is preferably symmetrical about its axis which is parallel to the image bundles and located preferably at distance $D_1$ from any image bundle juncture. The axis is an alignment element in accordance with the invention. When two such fiducial indicia are used, they are placed preferably near the upper and lower edges, respectively, of the print to provide for separation between the indicia to enhance the accuracy of rotational alignment, and are both located at the same distance $D_1$ from the outboard bundle so that they are coaxial. Thus, an imaginary line containing both their axes is parallel at distance $D_1$ to any image bundle juncture in the print, and is, therefore, at integral multiples n of bundle pitch W from every bundle juncture on the print.

At proper alignment, symmetrical indicia which are even multiples of W in width will coincide on their left and right edges, respectively, with lenticule junctures spaced an even number of lenticules apart, the indicia just filling the space therebetween, and their axes will coincide with a lenticule juncture between and equidistant from the other two. These relationships are optically discernible to a high degree of accuracy. Left and right edges of such fiducial indicia are alignment elements in accordance with the invention.

Fiducial indicia can also be odd integral multiples of W in width, for example, 1W, 3W, or 5W. These indicia also have left and right edges, respectively, which are located at different n values of $D_1$ and are alignable with lenticule junctures having an odd number of lenticules therebetween but no lenticule juncture between and equidistant from the other two. The axis of such an indicium is located at a value of $D_2$ which is half way between the just-noted values of $D_1$. The axis and the left and right edges of odd-multiple indicia are alignment elements in accordance with the invention. Because alignment of the axis of the fiducial indicium with a lenticule juncture is not possible, these indicia although falling within the scope of the invention are not preferred.

Fiducial indicia in accordance with the invention preferably also have at least one included angle, preferably acute, bisected by the axis of indicium. Such an included angle is another alignment element in accordance with the invention. The degree of coincidence of this angle with a lenticule juncture in the case of even-multiple indicia, or equidistant of the angle from adjacent lenticule junctures in the case of odd-multiple indicia, is a very sensitive indicator of proper alignment. Thus, preferred indicia are bilaterally symmetrical about an axis parallel to the bundles of the image at a distance $D_1$ therefrom and have at least one acute angle on and symmetrically bisected by the axis. Preferred shapes in accordance with these criteria are, for example, triangles, diamonds, arrows, truncated diamonds, and pentagons. Shapes falling within the scope of the invention but not preferred because they lack an included axial angle are, for example, arcuate lines, circles, ellipses, and rectangles.

A fiducial indicium in accordance with the invention can also be a fractional multiple of W in width, for example, 2.6W or 3.2W, provided it has an included angle as an alignment element disposed at a distance of either $D_1$ or $D_2$ from the outer edge of the outboard image bundle. These embodiments are not preferred because they rely on a single alignment element. They do not evenly fill the space between lenticule junctures and they do not have alignment edges which coincide with lenticule junctures when alignment is correct.

Fiducial indicia are placed on the lenticular print preferably by photographic exposure or printing by a computer-controlled exposing device at the time the print is made so that the indicia can be sized and located with respect to $D_1$ or $D_2$ and to each other with very high accuracy and permanence.

In a preferred method in accordance with the invention, the overlay is moved rotationally and translationally with respect to the lenticular print until the acute angles of two coaxial even-multiple indicia on the print margin coincide with a single lenticule juncture, the left and right edges of the indicia coincide with left and right lenticule junctures, respectively, and each indicium just fills the space between the left and right lenticule junctures. When this condition is obtained, every bundle juncture in the print is positioned directly under a lenticule juncture in the overlay, and therefore every image bundle in the print is accurately aligned parallel with and centered under a lenticule of the overlay (both rotational and translational requirements are satisfied).

A fiducial indicium on a print, when viewed through a lenticular overlay, presents a symmetrical appearance of stacked blocks, the spherical image of the fiducial indicium being transformed into a cylindrical image by the lenticules. By "spherical image" is meant the image seen by a human observer using normal spherical optics. By "cylindrical image" is meant the image seen by a human observer using cylindrical optics. If viewed instead from the back side of a transparency print by light projected through the lenticular overlay and the transparency, the fiducial indicium has a normal-appearing outline.

Deviations from accurate translation alignment are easily recognized in either viewing method. Viewed through the overlay, the stacked blocks of a misaligned fiducial indicium appear asymmetric and exhibit vertical shear. The blocks appear larger and axially longer on one side of the cylindrical image than on the other. Viewed from the back side of the transparency, the axial angle of a misaligned even-multiple fiducial indicium, for example, is seen to not coincide with a lenticule juncture in the overlay and to not be symmetrically disposed about a line. Either of these conditions is easily recognizable by a human operator or by well-known image-recognition systems, and translational corrections can be implemented until proper alignment as described above is achieved.

BRIEF DESCRIPTION OF THE DRAWINGS

The foregoing and other objectives, features, and advantages of the invention will be apparent from the following more particular description, including the presently preferred embodiment of the invention, as illustrated in the accompanying drawings in which:

FIGS. 3 through 8 show exemplary shapes for fiducial indicium suitable for use in accordance with the invention;

FIG. 9 shows an even-multiple (2W) fiducial indicium on a transparency media print in accordance with the invention in proper alignment with three lenticule junctures, as viewed through the print;

FIG. 10 shows the image of the indicium of FIG. 9 when projected through the lenticular overlay;

DETAILED DESCRIPTION OF THE INVENTION

A line on a first transparent image can be superimposed to coincide with an angle, point, or line on a second image, either visually or by machine, to a very high level of accuracy. This realization is exploited in our invention to overcome the problem of a "dead zone" experienced by known depth image alignment approaches which attempt to align directly the centers of lenticular lens segments over the centers of image bundles. As described hereinabove, such approaches have inherently low accuracy of alignment. We recognize that the lenticule junctures where lens segments meet appear as lines when viewed from either side of the lenticular overlay. These lines are displaced by ½ a lenticule width from the centers of lenticules and can be used as highly-accurate fiducial lines in aligning an overlay with a print. We place two-dimensional fiducial indicia having angular or linear (preferably both) alignment elements on a surface of a lenticular print (preferably in a margin outside the image region, although within the region is functionally equivalent if aesthetically permissible) at a fixed and predetermined distance from bundle junctures of the lenticular print. When the lenticular overlay is rotated and/or translated relative to the print such that the linear and pointed alignment elements of the fiducial indicia become aligned with and normal to ("coincide with") lenticule junctures in the overlay, then every bundle juncture in the print is accurately aligned with and normal to a lenticule juncture in the overlay, and thus every image bundle in the print is accurately aligned with and centered under a lenticule in the overlay (both rotational and translational requirements are satisfied).

Figure 1:
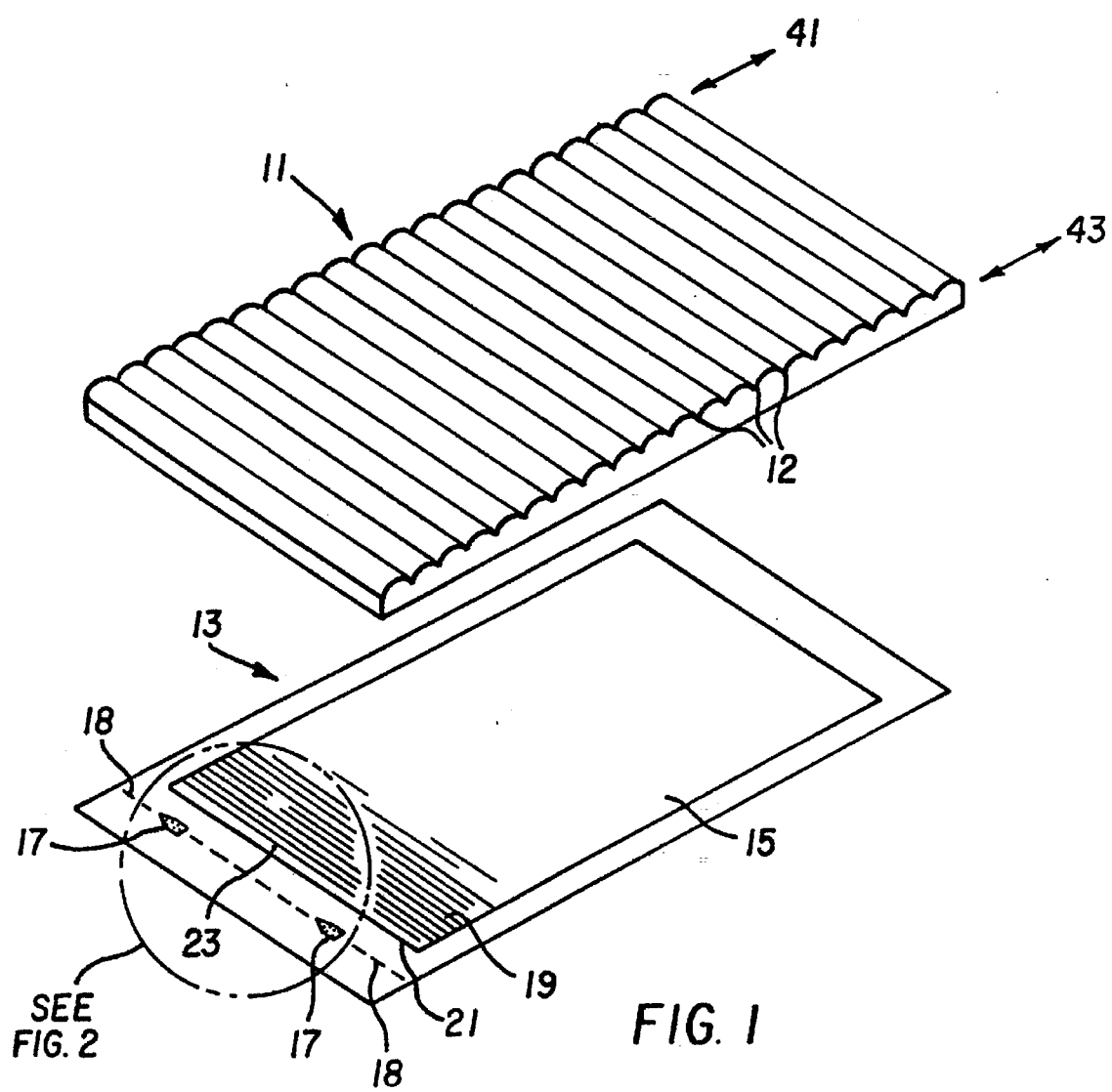
FIG. 1 shows a schematic exploded, isometric view of a lenticular overlay and a lenticular image print in accordance with the invention.
Figure 2:
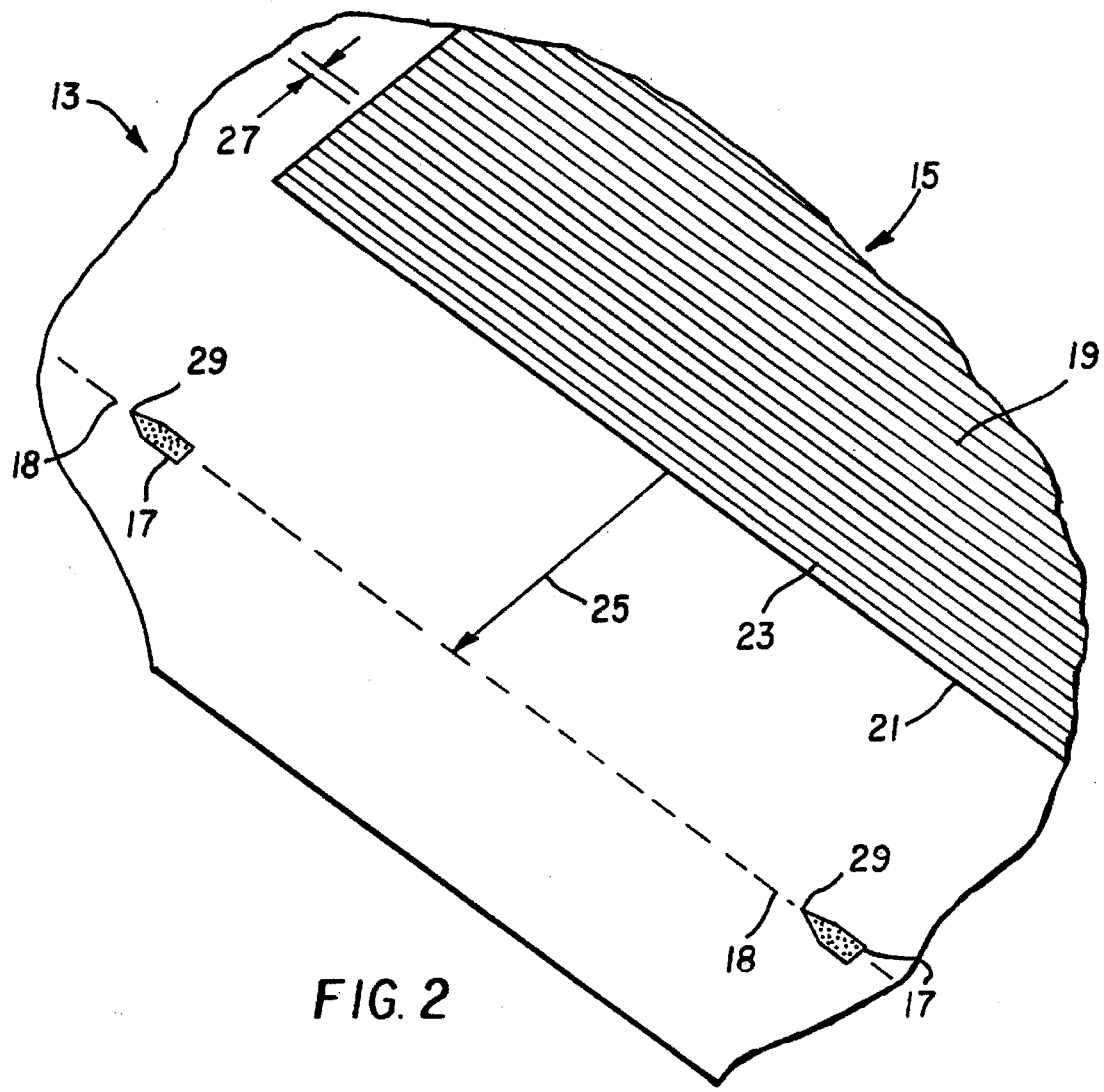
FIG. 2 shows an enlarged, detailed view of area 2—2 of FIG. 1.
Figure 3:
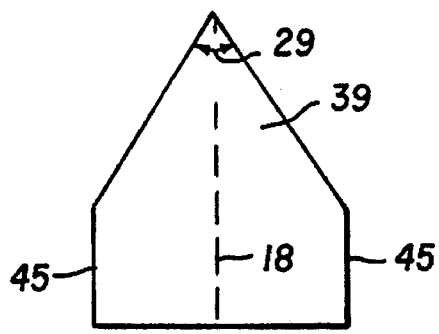
Figure 4:
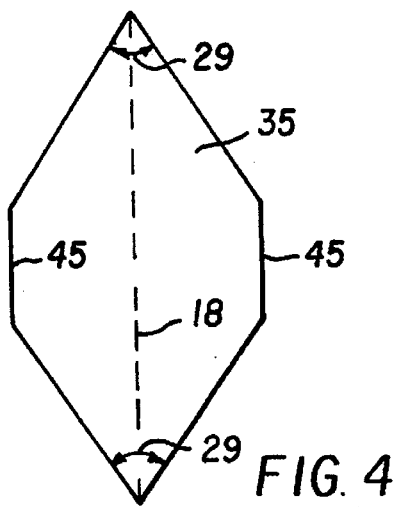

The present invention, as illustrated in FIGS. 1 and 2, involves aligning a lenticular overlay 11, having lenticule junctures 12, with a lenticular print 13. The print can be either a reflection print on an opaque support or a transparency print on a transparent support. The overlay 11 is larger than the image region 15 of the print 13, so that the overlay 11 covers one or more two-dimensional fiducial indicia 17 each having one or more alignment elements as described hereinbelow printed adjacent to image region 15. Indicia 17 are preferably printed on the same side as image region 15, although indicia 17 can be printed on the back side of a transparency print if the location requirements relative to the image region as described hereinbelow are met. On a reflection print having an opaque support, indicia 17 must be printed on the same side as image region 15.

The overlay is a conventional transparent lenticular sheet formed from, for example, poly(ethyleneterephthalate), and having a fixed number of lenticules per centimeter of width, for example, 20 or 40, the reciprocal being the pitch of each lenticule. The pitch of the lenticular overlay must match with high precision the pitch of the lenticular print so that the depth image or multiple image is accurate and free of distortion across its entire width.

Although alignment using a single fiducial indicium is possible, in practice it is preferable to use at least two fiducial indicia to assure both rotational and translational alignment of image region 15 with overlay 11. Two such fiducial indicia are preferably spaced apart to make rotational alignment of print and overlay easy and accurate.

The fiducial indicia 17 are preferably printed in the same direction as the scan lines forming the image bundles 19 of the pictorial image in the image region 15 and by the same device. Each fiducial indicium 17 is preferably symmetrical about an axis 18 parallel to the image bundles 19 and spaced from the outer edge 21 of the outboard bundle 23 of the image region of the print at any distance 25 which is an integral multiple n of the pitch of the bundles. The axis of an axially symmetrical fiducial indicium is a linear alignment element in accordance with the invention. The plurality of fiducial indicia are thus coaxial at distance 25 from the outer edge 21 of the image region 15. An imaginary line containing both their axes is parallel at distance $D_1$ to any image bundle juncture 68 in the print, and is, therefore, at integral multiples n of bundle pitch W from every bundle juncture on the print. Of course, the fiducial indicia can also be located if desired within the image area of the print at any distance 25 from the outer edge 21.

Each fiducial indicium preferably has at least one internal angle 29, preferably acute, which preferably is bisected by axis 18. Internal angle 29 is an angular alignment element in accordance with the invention. FIGS. 3 through 8 show some shapes preferred in accordance with the invention, for example, triangle 31, and shapes having a triangular component, such as diamond 33, truncated diamond 35, arrow 37, chevron 38, and pentagon 39, each having at least one, preferably acute, internal angle 29. The embodiments of FIGS. 3 and 4 also comprise parallel sides 45 which can be accurately superimposed on lenticule junctures. Parallel sides are linear alignment elements in accordance with the invention. Other shapes within the scope of the invention and having linear alignment elements are, for example, squares and rectangles, but these are not preferred since they lack at least one internal angle bisected by an axis of bilateral symmetry.

As overlay 11 and print 13 are rotated or translated with respect to each other as shown in FIG. 1, the image of each fiducial indicium 17, as projected through the overlay or viewed against the overlay, changes. To move the print and overlay with respect to each other, the print 13 can be held in a stationary position and the overlay 11 moved preferably by providing motion to the overlay 11 from one or both of lenticular alignment points 41 and 43. It is possible, of course, to hold the overlay 11 stationary and to move the print 13 or to move both the overlay and the print. If the lenticular alignment points 41 and 43 are moved simultaneously in the same direction, translation occurs. If one of points 41 and 43 is held stationary and the other moved, rotational motion occurs. If one of points 41 and 43 is moved in one direction and the other point is moved in the opposite direction, rotation also occurs.

When the projected image of a fiducial indicium is accurately superimposed on a projected image of a lenticule juncture 12, such as indicium 44 in FIG. 9, the overlay is properly aligned with the print. Viewed from the back side of a transparency print, the alignment will appear as in FIG. 9 (indicia cannot be seen from the back side of a reflection print, so alignment can be guided and assessed from the back side with only a transparency print). Acute angle 29 on indicium 44 is superimposed on and coincident with lenticule juncture 12. In this case, indicium 44 is substantially two lenticules wide (2W), so that sides 45 of indicium 44 coincide with, and indicium 44 fills the space between, lenticule junctures 47 and 49, providing additional visual clues as to when proper alignment is achieved. Indicia having several such alignment elements are preferred over indicia having few or only one alignment element.

Lenticular overlay material is commonly available having pitches of 20 or 40 lenticules per centimeter (2 or 4 per millimeter). For a 20-pitch overlay, a preferred two-lenticule fiducial indicium such as indicium 44 shown in FIGS. 9–12 has a width of 1 mm. For a 40-pitch overlay, a two-lenticule fiducial indicium has a width of 0.5 mm, and a four-lenticule fiducial indicium such as indicium 51 shown in FIGS. 13–16 has a width of 1 mm.

Figure 11:
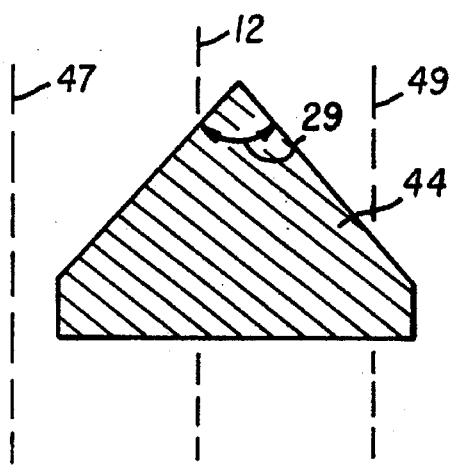
FIG. 11 shows the fiducial indicium of FIG. 9 but translationally misaligned with the lenticular overlay.
Figure 12:
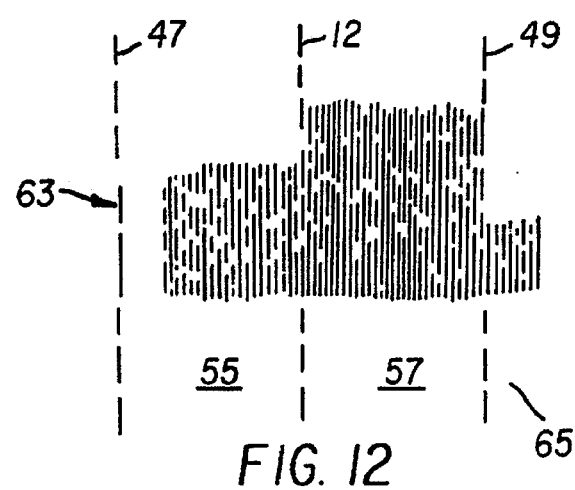
FIG. 12 shows the image of the indicium of FIG. 11 when projected through the lenticular overlay.
Figure 13:
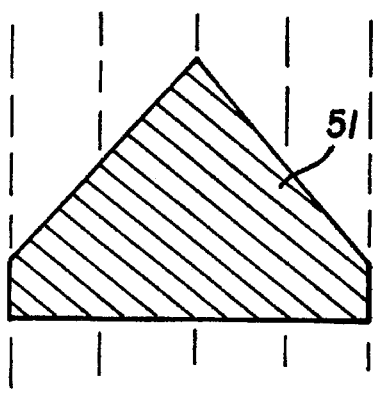
FIGS. 13 through 16 are like FIGS. 9 through 12, respectively, except that the pitch of the lenticular overlay is one-half that of the lenticular overlay in FIGS. 9 through 12.

Viewed from the front side through a correctly aligned lenticular overlay, indicium 44 appears as in FIG. 10. The spherical view of indicium 44 is transformed to a cylindrical image 53 by cylindrical lenticules 55 and 57 and appears as two blocks 59 and 61 of equal size disposed symmetrically to the left and right of lenticule juncture 12. The shape of the lenticular image of indicium 44 is quite sensitive to misalignment, and small deviations from proper alignment can cause large image changes. In FIG. 11 is shown the fiducial indicium of FIG. 9 but translationally misaligned by about one-fourth pitch. The corresponding cylindrical image 63 is shown in FIG. 12. The image 63 covers part or all of three lenticules 55, 57, and 65, and is not symmetrical either laterally or vertically. The lenticular image 63 in FIG. 12 is easily distinguished visually from image 53 in FIG. 10. Translation of either the overlay or the print in the proper direction to the proper distance will cause the misalignment shown in FIGS. 11 and 12 to disappear, resulting in the proper alignment shown in FIGS. 9 and 10.

FIGS. 13 and 14 and FIGS. 15 and 16 are similar to FIGS. 9 through 12 as discussed hereinabove, except that the fiducial indicium 51 is the width of four lenticules (4W) rather than two. The lenticular images at alignment 53 and misalignment 63 differ in shape from those in the previous example but are also easily distinguished from each other.

Figure 17:
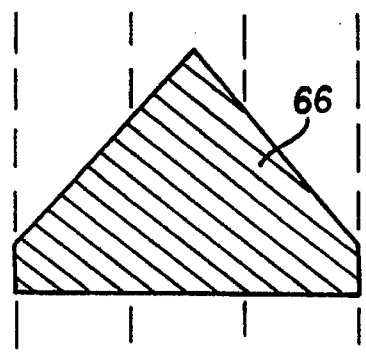
FIG. 17 shows an odd-multiple (3W) fiducial indicium on a transparency media print in accordance with the invention in proper alignment with the outer two lenticule junctures, as viewed through the print.
Figure 18:
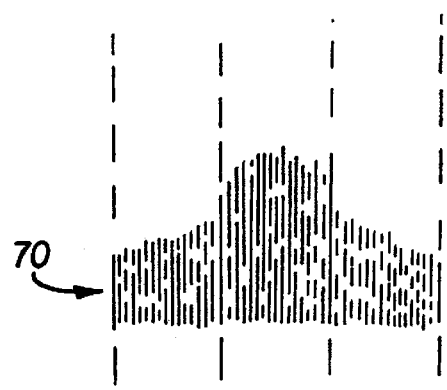
FIG. 18 shows the image of the indicium of FIG. 17 when projected through the lenticular overlay.

FIG. 17 shows an odd-multiple indicium 66 (3W) in alignment on three lenticules. The included angle of indicium 66 is not alignable with a lenticule juncture, and therefore odd-multiple indicia are not preferred. The cylindrical image 70 of indicium 66 is shown in FIG. 18. While it is clearly centered on the three lenticules, the lack of indication of precise angular alignment on the axis of indicium 66 shows that odd-multiple indicia are inferior to even-multiple indicia, although both types fall within the scope of the invention.

Figure 19:
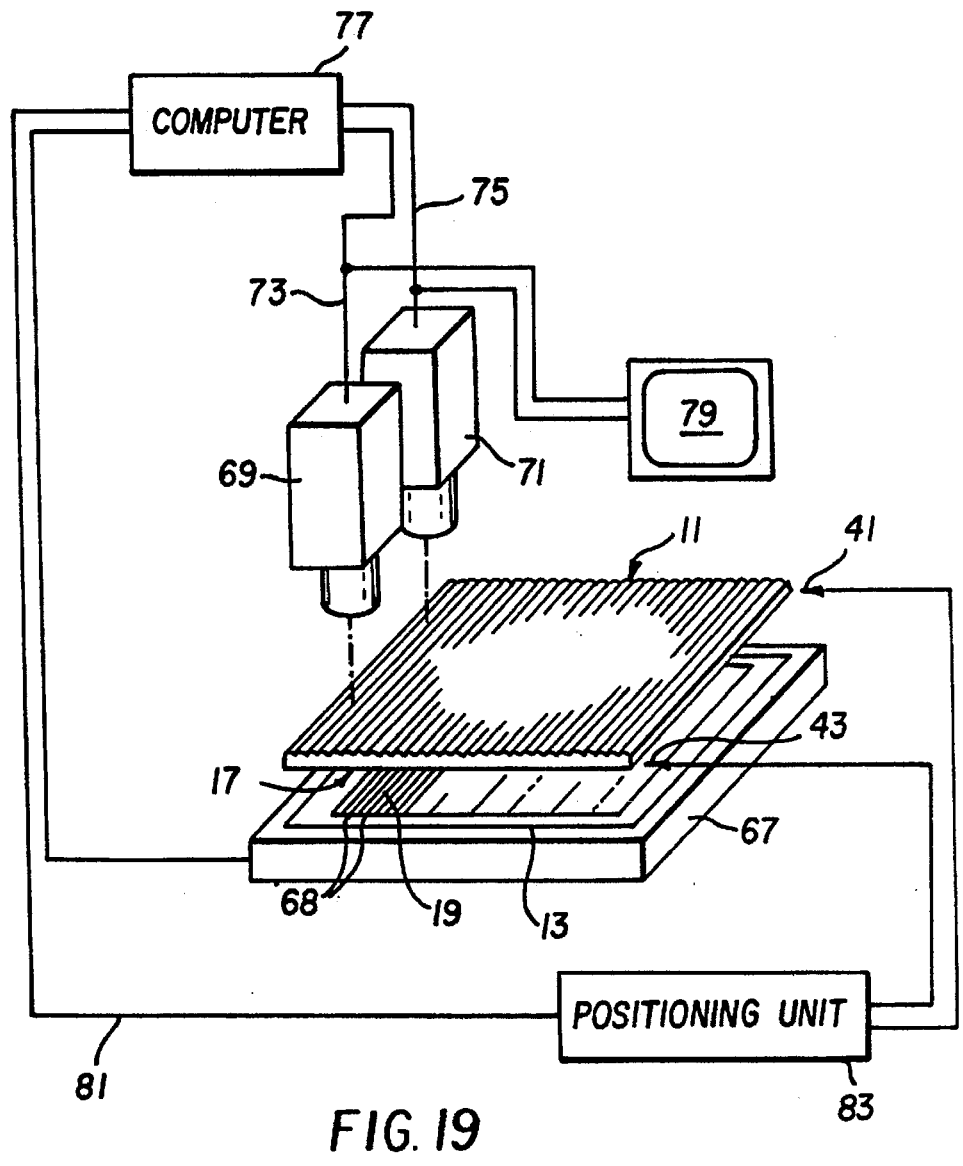
FIG. 19 shows a simplified schematic view of an apparatus for implementing a method in accordance with the invention.

A schematic diagram for a system whereby rotational and translational alignment between a lenticular overlay and a lenticular print in accordance with the subject invention can be achieved is shown in FIG. 19. Lenticular print 13, composed of bundles 19 of image lines on its upper surface and having two two-dimensional fiducial indicia 17 (second indicium not visible) of size, shape, orientation, and relative placement in accordance with the invention, and being coated on its upper surface with a thin layer of transparent liquid adhesive (not shown), preferably a non-cured radiation-curable adhesive, is mounted on a restraining surface 67, for example, a vacuum board. For a transparency print, the vacuum board is transparent in at least the areas of the fiducial indicia and has a light source (not shown) below it so that the fiducial indicia can be projected from below. For a reflection print, a light source (not shown) is provided above the vacuum board. A lenticular overlay 11 having the same pitch as lenticular print 13 is mounted in a positioning apparatus (detail not shown) above print 13 having the axes of its lenticules approximately parallel to the bundle junctures 68 in lenticular print 13, and in full contact on its underside with the adhesive layer on lenticular print 13. Image-sensing electronic cameras 69 and 71, for example, CCD-equipped cameras, are mounted above the plane of the lenticular overlay and are directed through the lenticular overlay to regions of the vacuum board wherein projection images of the first and second fiducial indicia, respectively, are located. An operator positions the lenticular print such that each camera, respectively, acquires one of the two fiducial images through the overlay superimposed on an image of the overlying lenticule junctures. The cameras 69 and 71 each magnify their cylindrical images, respectively, and transmit them via cables 73 and 75 to a computer 77 and to a split-screen video monitor 79. The computer is programmed to compare the CCD patterns transmitted by each camera to each other and to send a signal via cable 81 to positioning unit 83 to rotate overlay 11 in the proper direction relative to print 13 as described hereinabove until the lenticular images seen by cameras 69 and 71 and compared in computer 77 are identical, indicating that rotational alignment between the overlay and the print is achieved. Alternatively, an operator can view the images on monitor 79 and can manually actuate the positioning unit 83 to rotate the overlay until a visual match between the images is achieved, indicative of accurate rotational alignment between overlay and print. Further rotational motion of the overlay is then disabled.

Figure 14:
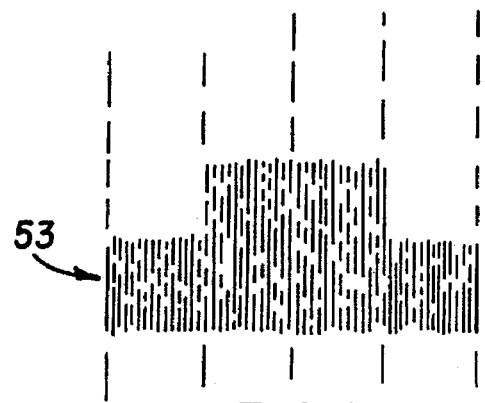
Figure 15:
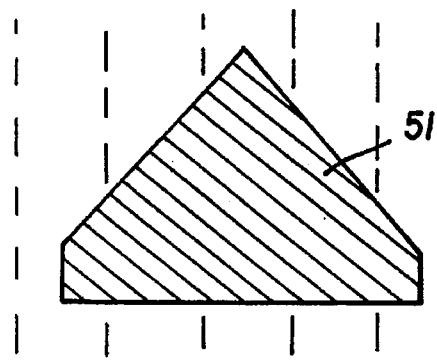
Figure 16:
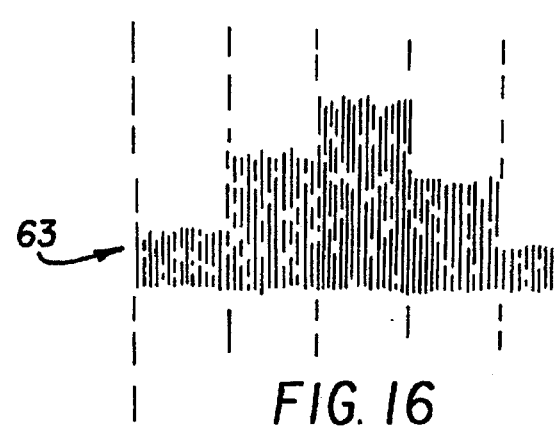

Computer 77 compares the now-identical images from the two cameras 69 and 71 with a reference alignment image of fiducial indicia 17 in memory, which reference image is indicative of accurate rotational and translational alignment of the overlay and the print. If the now-identical images do not match the reference image, computer 77 sends a signal to positioning unit 83 to translate overlay 11 in the proper direction relative to print 13 as described hereinabove until the lenticular images seen by the cameras match the reference alignment image in memory. Alternatively, an operator can view the images on the monitor 79 and can manually actuate the positioning unit 83 until an optimum translational alignment image, for example, like those in FIGS. 10, 14, or 18, is achieved. Subsequent irradiation of the radiation-curable layer by a source of suitable wavelength (not shown) for a time sufficient to polymerize the adhesive serves to bond the overlay to the print in accurate rotational and translational alignment.

In an alternative arrangement (not shown) of the apparatus of FIG. 19, the cameras are disposed below the vacuum board on the same camera optic axes as shown in FIG. 19, so that the system considers the images of the fiducial indicia projected from the back side of print 13 which must be a transparency print. These are spherical images like those in FIGS. 9, 11, 13, 15, and 17, and are not cylindrically transformed. An appropriate spherical reference image is required, showing the fiducial indicium coincident with the lenticule junctures. Otherwise, the system functions the same as that in FIG. 19.

The many features and advantages of the invention are apparent from the detailed specification and, thus, it is intended by the appended claims to cover all such features and advantages which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, although the present invention has been described with respect to aligning a lenticular print or transparency with an overlay, the same technique can be used to align an image produced by a CRT with a lenticular face plate.

| | Parts List |
|---|---|
| 11 | lenticular overlay |
| 12 | lenticular junctures |
| 13 | lenticular print |
| 15 | image region |
| 17 | two-dimensional fiducial indicia |
| 18 | axis of 17 |
| 19 | bundles of image lines |
| 21 | outer edge of 15 |
| 23 | outboard bundle of 19 |
| 25 | distance |
| 27 | width of bundle |
| 29 | internal angle in 17 |
| 31 | triangle |

| | -continued Parts List |
|---|---|
| 33 | diamond |
| 35 | truncated diamond |
| 37 | arrow |
| 38 | chevron |
| 39 | pentagon |
| 41 | first lenticular alignment point |
| 43 | second lenticular alignment point |
| 44 | indicium in FIG. 9 |
| 45 | sides of 37 |
| 47 | first lenticule juncture |
| 49 | second lenticule juncture |
| 51 | four-lenticule indicium |
| 53 | cylindrical image of 44 |
| 55 | first cylindrical lenticule |
| 57 | second cylindrical lenticule |
| 59 | first block |
| 61 | second block |
| 63 | lenticular image in FIG. 12 |
| 65 | third lenticule |
| 66 | three-lenticule indicium |
| 67 | restraining surface |
| 68 | bundle junctures |
| 69 | first CCD camera |
| 70 | cylindrical image of 66 |
| 71 | second CCD camera |
| 73 | cable for 69 |
| 75 | cable for 71 |
| 77 | computer |
| 79 | video monitor |
| 81 | cable from computer to positioning unit |
| 83 | positioning unit |

What is claimed:

1. A lenticular print having two surfaces, comprising:
   a) an image region on one of said surfaces containing a plurality of parallel image bundles of equal width, adjacent bundles having bundle junctures there between and being set at a pitch W; and
   b) a two-dimensional fiducial indicium on one of said surfaces, said indicium having an alignment element disposed at a predetermined distance from any one of said bundle junctures, and wherein said fiducial indicium is at least as wide as two of said parallel image bundles.

2. A print in accordance with claim 1 further comprising a plurality of fiducial indicia, each having an alignment element.

3. A lenticular print in accordance with claim 2 wherein at least one of said plurality of fiducial indicia contains a plurality of alignment elements.

4. A print in accordance with claim 2 wherein each of said plurality of fiducial indicia has an axis, and said axes are coaxial and parallel with said bundle junctures.

5. A print in accordance with claim 2 wherein said predetermined distance is $D_1$, defined as $$D_1 = nW$$

where n is an integral number.

6. A print in accordance with claim 2 wherein said predetermined distance is $D_2$, defined as $$D_2 = D_1 + \tfrac{1}{2} W.$$

7. A print in accordance with claim 2 wherein each of said plurality of fiducial indicia has a shape selected from the group consisting of: a square, a rectangle, a triangle, an arrow, a diamond, a truncated diamond, and a pentagon.

8. A print in accordance with claim 2 wherein one of said plurality of fiducial indicia is equal in width to an even integral multiple of said pitch.

9. A print in accordance with claim 2 wherein one of said plurality of fiducial indicia is equal in width to an odd integral multiple of said pitch.

10. A print in accordance with claim 2 wherein one of said plurality of fiducial indicia is equal in width to a fractional multiple of said pitch.

11. A print in accordance with claim 4 wherein said alignment elements of said fiducial indicia are selected from the group consisting of: an angle bisected by any one of said axes, an edge parallel to either of said axes, and included angles not bisected by either of said axes and equidistant from either of said axes.

12. A print in accordance with claim 11 wherein said angle bisected by any one of said axes is an acute angle.

13. A print in accordance with claim 1 further comprising a transparent support and having said fiducial indicium on the same side of said support as said image bundles.

14. A print in accordance with claim 1 further comprising a transparent support and having said fiducial indicium on the side of said support opposite said image bundles.

15. A print in accordance with claim 1 further comprising an opaque support.

16. An apparatus, comprising:
   a) a lenticular print having an image region containing a plurality of parallel image bundles of equal width, adjacent bundles having bundle junctures therebetween and being set at a pitch W, the print having first and second two-dimensional fiducial indicia each having one or more alignment elements disposed at one of two predetermined distances from any one of said bundle junctures, and wherein said fiducial indicium is at least as wide as two of said parallel image bundles;
   b) a lenticular overlay slidably positioned on said lenticular print to project images of said first and second fiducial indicia; and
   c) positioning means positioning said overlay responsive to one or more characteristics of said first and second projected images.

17. An apparatus in accordance with claim 16 wherein said first and second projected images are changeable in appearance with different positions of said overlay with respect to said print.

18. An apparatus in accordance with claim 17 wherein a unique appearance of said first and second projected images is indicative of proper optical alignment of said overlay with said print.

19. An apparatus in accordance with claim 16 wherein said lenticular overlay comprises a plurality of parallel lenticules each lenticule being juxtaposed to one of said image bundles and being of the same width as said pitch, said lenticules meeting at lenticule junctures, each of said lenticules having a convex lens surface opposite said lenticular print.

20. An apparatus in accordance with claim 16 wherein said first and second two-dimensional fiducial indicia are spaced apart on said lenticular print, have respective first and second axes parallel to said plurality of parallel image bundles, said axes being coaxial with each other.

21. An apparatus in accordance with claim 16 wherein the first of said two predetermined distances is $D_1$, defined as $$D_1 = nW$$

where n is an integral number.

22. An apparatus in accordance with claim 16 wherein the second of said two predetermined distances is $D_2$, defined as $$D_2 = D_1 + \tfrac{1}{2}W.$$

23. An apparatus in accordance with claim 16 wherein said first and second projected images are spherical images visible in a space adjacent to a side of said lenticular print which is opposite to a side on which said overlay is positioned.

24. An apparatus in accordance with claim 19 wherein said first and second projected images are cylindrical images visible in a space adjacent to said convex lens surfaces and opposite said print.

25. An apparatus in accordance with claim 22 wherein said characteristic of said first and second projected images is selected from the group consisting of: shape, parallelism to said lenticule junctures, coincidence with one of said lenticule junctures, and equidistant between two adjacent lenticule junctures.

26. An apparatus in accordance with claim 25 wherein said positioning means positions said overlay rotationally and translationally responsive to at least one of said characteristics of said first and second projected images.

27. An apparatus in accordance with claim 16 wherein said positioning means comprises:
   a) a first camera viewing said first projected image of said first two-dimensional fiducial indicium;
   b) a second camera viewing said second projected image of said second two-dimensional fiducial indicium;
   c) means for differentially comparing said first and second projected images; and
   d) means responsive to said differential comparison for slidably moving said overlay with respect to said print.

28. An apparatus in accordance with claim 27 wherein said positioning means further comprises:
   a) means for comparing said first and second projected images to a reference image; and
   b) means responsive to said reference comparison for slidably moving said overlay with respect to said print.

29. A method for aligning a lenticular overlay having parallel lenticules and lenticule junctures therebetween with a lenticular print having parallel image bundles and bundle junctures therebetween, comprising the steps of:
   a) providing a lenticular print having first and second two-dimensional fiducial indicia on a surface thereof, said indicia each having one or more alignment elements disposed on said lenticular print at a critical distance from any image bundle juncture, and wherein said fiducial indica is at least as wide as two of said parallel image bundles;
   b) providing a lenticular overlay in slideable contact with said lenticular print;
   c) projecting first and second images of said first and second fiducial indicia, thereby defining projected first and second images, said projected first and second images showing said alignment elements;
   d) moving said overlay with respect to said print until each of said projected first and second images coincides with a single lenticule juncture; and,
   e) translating and rotating said overlay until said projected first and second images form symmetrically arranged blocks about one of said lenticule junctures.

30. A method in accordance with claim 29 further comprising the steps of:
   a) providing a reference image showing the appearance of said first fiducial indicium when correctly aligned with said lenticule junctures;
   b) comparing said identical first and second projected images to said reference image; and
   c) translating said overlay until said identical first and second projected images match said reference image.

* * * * *